United States Patent
Wan et al.

(10) Patent No.: US 11,373,328 B2
(45) Date of Patent: Jun. 28, 2022

(54) METHOD, DEVICE AND STORAGE MEDIUM FOR POSITIONING OBJECT

(71) Applicant: BEIJING BAIDU NETCOM SCIENCE AND TECHNOLOGY CO., LTD., Beijing (CN)

(72) Inventors: Guowei Wan, Beijing (CN); Shenhua Hou, Beijing (CN); Shiyu Song, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 17/038,231

(22) Filed: Sep. 30, 2020

(65) Prior Publication Data
US 2021/0192777 A1  Jun. 24, 2021

(30) Foreign Application Priority Data
Dec. 23, 2019  (CN) .......................... 201911337308.4

(51) Int. Cl.
*G06T 7/73* (2017.01)
*G01S 17/89* (2020.01)
(Continued)

(52) U.S. Cl.
CPC ................ *G06T 7/73* (2017.01); *G01S 17/89* (2013.01); *G06K 9/6215* (2013.01); *G06N 7/005* (2013.01);
(Continued)

(58) Field of Classification Search
USPC ....................................................... 382/103
See application file for complete search history.

(56) References Cited

U.S. PATENT DOCUMENTS 10,380,890 B2 * 8/2019 Wang ...................... G01S 17/89
10,579,065 B2 * 3/2020 Wang ...................... G01S 13/86
(Continued)

FOREIGN PATENT DOCUMENTS

WO   WO 2019065546 A1   4/2019

OTHER PUBLICATIONS

Wan et al., Robust and Precise Vehicle Localization based on Multi-sensor Fusion in Diverse City Scenes, May 2018, IEEE 978-1-5386-3081, pp. 4670-4677. (Year: 2018).*
(Continued)

*Primary Examiner* — Ishrat I Sherali
(74) *Attorney, Agent, or Firm* — Lathrop GPM LLP

(57) ABSTRACT

The disclosure provides a method, an apparatus, a device and a storage medium for positioning an object. The method includes: obtaining a map related to a region where the object is located, the map including a plurality of map layers having different height information; determining, based on the map and current point cloud data related to the object, an estimated position of the object, an estimated height corresponding to the estimated position and an estimated probability that the object is located at the estimated position with an estimated posture; and determining, at least based on the estimated position, the estimated height and the estimated probability, positioning information for the object, the positioning information indicating at least one of a current position of the object, a current height of the object and a current posture of the object.

18 Claims, 8 Drawing Sheets

(51) Int. Cl.
  *G06K 9/62* (2022.01)
  *G06N 7/00* (2006.01)
  *G06V 10/20* (2022.01)
(52) U.S. Cl.
  CPC .. *G06V 10/255* (2022.01); *G06T 2207/10028* (2013.01); *G06V 2201/07* (2022.01)

(56) References Cited

U.S. PATENT DOCUMENTS

| | | | | |
|---|---|---|---|---|
| 10,962,370 | B2* | 3/2021 | Zhang | G01S 17/89 |
| 2020/0226794 | A1* | 7/2020 | Sugio | H04N 13/275 |

OTHER PUBLICATIONS

Sock et al., Probabilistic Traversability Map Generation Using 3D-LIDAR and camera, 2016, IEEE 978-1-4673-8026-3/16, pp. 5631-5637. (Year: 2016).*
European Patent Application No. 20201292.8 extended Search and Opinion dated Mar. 9, 2021, 10 pages.
Wan, G. et al. "Robust and Precise Vehicle Localization based on Multi-sensor Fusion in Diverse City Scenes" arxiv.org Cornell University Library; Nov. 15, 2017; 8 pages.

* cited by examiner

METHOD, DEVICE AND STORAGE MEDIUM FOR POSITIONING OBJECT

CROSS-REFERENCE TO RELATED APPLICATION

This application claims priority to Chinese Patent Application No. 201911337308.4, filed on Dec. 23, 2019, the entire contents of which are incorporated herein by reference.

FIELD

Embodiments of the present disclosure relate to the field of data processing, and particularly to the field of autonomous driving, and more particularly to a method, an apparatus, a device and a computer-readable storage medium for positioning an object.

BACKGROUND

High-accuracy positioning techniques are important for autonomous driving technologies, which are the basis for unmanned vehicles making path plans, control decisions and perceptions. Conventional positioning solutions mainly include a positioning solution based on Global Navigation Satellite System (GNSS)/Inertial Measurement Unit (IMU), a LiDAR-based positioning solution, and a positioning solution based on a camera.

With the development of unmanned vehicle technologies, the LiDAR-based positioning solution is becoming more and more common and important. Generally, the LiDAR needs to be used in cooperation with an accurate map to obtain a correct position of the vehicle, thereby facilitating the correct driving of the vehicle.

SUMMARY

According to embodiments of the present disclosure, there is provided a solution for positioning an object.

In a first aspect of the present disclosure, a method of positioning an object is provided. The method comprises obtaining a map related to a region where an object is located. The map comprises a plurality of map layers having different height information. The method further comprises determining, based on the map and current point cloud data related to the object, an estimated position of the object, a height corresponding to the estimated position and an estimated probability that the object is located at the estimated position with an estimated posture. In addition, the method further comprises determining, based on the estimated position, the height corresponding to the estimated position and the estimated probability, positioning information indicating at least one of: a current position of the object, a current height of the object and a current posture of the object.

In a second aspect of the present disclosure, there is provided an electronic device comprising one or more processors; and a storage apparatus for storing one or more programs which, when executed by the one or more processors, cause the one or more processors to perform the method according to a first aspect of the present disclosure.

In a third aspect of the present disclosure, there is provided a computer-readable storage medium having a computer program stored thereon that, when executed by a processor, performs the method according to the first aspect of the present disclosure.

It should be appreciated that the content described in the Summary of the present disclosure is not intended to define key or essential features of implementations of the subject matter described herein, nor is it intended to limit the scope of the subject matter described herein. Other features of the present disclosure will be made apparent by the following description.

BRIEF DESCRIPTION OF THE DRAWINGS

In conjunction with the accompanying drawings and with reference to the following detailed description, the above and other features, advantages, and aspects of embodiments of the subject matter described herein will become more apparent. In the figures, identical or like reference numbers denote identical or like elements, wherein.

DETAILED DESCRIPTION OF EMBODIMENTS

Figure 1:
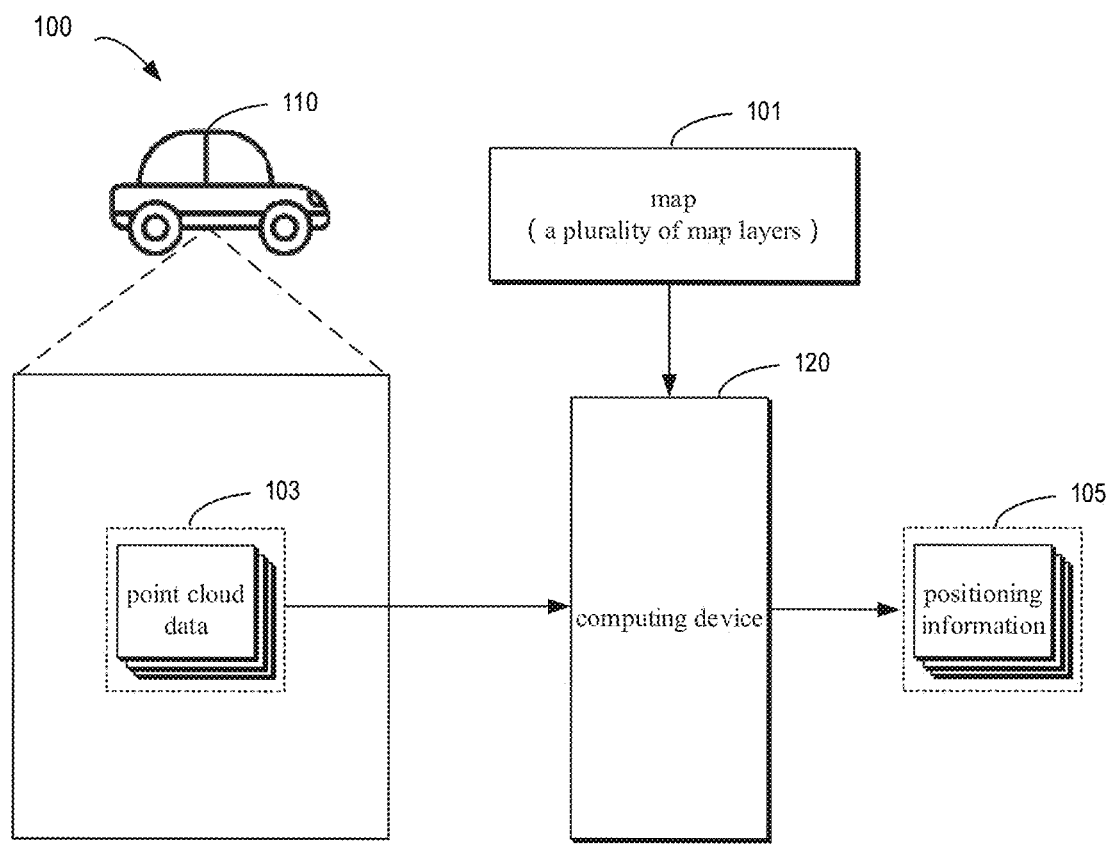
FIG. 1 shows a schematic diagram of an example environment 100 for positioning an object according to an embodiment of the present disclosure.

Hereinafter, embodiments of the subject matter described herein will be described in more detail with reference to the accompanying drawings. Although some embodiments of the subject matter described herein are illustrated in the drawings, it is to be understood that the subject matter described herein may be implemented through various forms, but may not be interpreted as being limited to the embodiments illustrated herein. On the contrary, these embodiments are provided for the purpose of understanding the subject matter described herein more thoroughly and completely. It is to be understood that the accompanying drawings and embodiments of the subject matter described herein are only for the purpose of illustration, and are not intended to limit the protection scope of the subject matter described herein.

As used herein, the terms "includes", "comprises" or like terms should be interpreted as open-ended terms that mean "includes, but is not limited to." The term "based on" should be interpreted as "based at least in part on." The terms "one example embodiment" and "an example embodiment" should be interpreted as "at least one example embodiment." The term "another example embodiment" should be interpreted as "at least one another example embodiment". Relevant definitions of other terms will be given in the depictions hereunder.

As mentioned above, high-accuracy positioning is desired to be achieved, so as to meet the requirements of autonomous driving. Conventional positioning solutions mainly include a positioning solution based on Global Navigation Satellite System (GNSS)/Inertial Measurement Unit (IMU), a LiDAR-based positioning solution, and a positioning solution based on a camera.

The LiDAR-based solution can accurately measure the position and depth of each of the sites by using Lidar, and high-accuracy positioning can be realized by matching the position and depth of each of the sites with a point cloud map. However, there are complex scenes in real roads which have a large amount of information in the height direction, and a conventional single-layer Gaussian model map based on point cloud data cannot reflect the information in the height direction. For example, in the case of an overpass/multi-layer road scene or in a case where some changes occur in partial scene in the vertical direction, the positioning error is large and even the positioning location may drift. In another example, when the models and installation methods of the LiDAR on a map capturing vehicle are different from that on the autonomous driving vehicle, the positioning error is usually large or the positioning location drifts.

According to embodiments of the present disclosure, a solution for high-accuracy positioning is proposed. In this solution, point cloud data related to a to-be-positioned object is obtained. An estimated position of the object, an estimated height corresponding to the estimated position and an estimated probability that the object is located at the estimated position with an estimated posture are determined based on a matching degree between the point cloud data and a corresponding map having a plurality of height layers. Thereby, the final positioning information for the object at a current time instant may be determined. This solution may advantageously achieve positioning of the object with high accuracy (for example, centimeter-level) in various complex scenarios, such as overpass/multilayer road scenarios.

Embodiments of the present disclosure will be specifically described below with reference to the figures. As used herein, the term "posture" refers to a posture of the object in a specific coordinate system. For example, in a two-dimensional coordinate system and a three-dimensional coordinate system, the posture of the object may be represented by a heading angle. In the three-dimensional coordinate system, the posture of the object may further be represented with a pitch angle and a rotation angle as well as the heading angle. Hereinafter, embodiments of the present disclosure will be discussed by using examples in which "posture" is the heading angle in the three-dimensional coordinate system. That is, in the three-dimensional coordinate system, two-dimensional coordinates (x, y) of the object, a height z of the object (for example, altitude or height relative to a specific reference plane), and a heading angle h of the object will be considered. It should be understood, however, that this is only for illustration purposes and is not intended to limit the scope of the present disclosure.

Furthermore, the term "object" refers to any vehicle or any other object to be positioned. Hereinafter, a moving vehicle is taken as an example in some cases. However, it should be appreciated that this is only for illustration purposes and is not intended to limit the scope of the present disclosure. Similarly embodiments of the present disclosure may be also applied to other objects such as an aircraft.

FIG. 1 shows a schematic diagram of an example environment 100 for positioning an object in which embodiments of the present disclosure may be implemented. As shown in FIG. 1, the environment 100 may generally include an object 110 and a computing device 120. Although the computing device 120 is shown as being separated from the object 110 in FIG. 1, it is for exemplary purposes only. In some embodiments, the computing device 120 may also be included in the object 110. For example, when the object 110 is an autonomous vehicle, the computing device 120 may be a computing device in said vehicle.

The computing device 120 may determine the position, altitude, and posture (e.g., heading angle) of the object 110 while the object 110 is moving. As shown in FIG. 1, the computing device 120 may obtain a map 101 on a geographic area where the object 110 is located. The map 101 includes a plurality of map layers having different height information. In some embodiments, the map 101 may be generated based on point cloud data (which will be further described below with reference to FIG. 3 and FIG. 4), and stored in a storage apparatus in a form of a multi-layer grid. The storage apparatus (not shown in FIG. 1) may be coupled to the computing device 120 or remote from the computing device 120. The computing device 120 may obtain the map 101 from the storage apparatus storing the map 101.

The computing device 120 may be any electronic device capable of processing data, including but not limited to a mobile phone (e.g., a smart phone), a laptop computer, a Portable Digital Assistant (PDA), an E-book reader, a portable game machine, a portable media player, a game console, a set-top box (STB), a smart TV, a personal computer, a laptop computer, a vehicle-mounted computer (e.g., a navigation unit), a multiprocessor system, a consumer electronic, a mainframe computer, a distributed computing environment including any of the above systems or devices.

At least one motion measurement device and a LiDAR may be installed on the object 110. The "motion measurement device" described herein may refer to any sensor or measurement device capable of obtaining information related to the motion of the object 110, including but not limited to an IMU (such as including an accelerometer, a gyroscope, etc.) and a speed sensor (such as a tachometer) and the like. The motion measurement device may obtain information related to the motion of the object 110, and, for example, said information may include but not limited to the angular velocity, speed (for example, wheel speed), acceleration, and the like of the object 110.

As shown in FIG. 1, when the object 110 is moving, the surrounding space may be scanned by a data acquisition device, such as a LiDAR, to obtain point cloud data 103 at a current time instant. The point cloud data 103 is captured at a predetermined time interval and sent to the computing device frame by frame. The computing device 120 may obtain the map 101 and the point cloud data 103 at the current time instant, and determine positioning information 105 of the object 110 based on at least the map 101 and the point cloud data 103. The positioning information 105 may indicate information such as two-dimensional position, height, and posture of the object 110. For example, the positioning information 105 may include the following items of the object 110: the current position $(\hat{x}, \hat{y})$, the current height $\hat{z}$, and the current posture $\hat{h}$ (for example, the heading angle).

In some embodiments, the computing device 120 may, for example, present the positioning information 105 to a user (e.g., a driver driving a vehicle represented by the object 110) in a visualized form (described further below with reference to FIG. 10), or the positioning information 105 may be used for path planning and/or control decisions in autonomous driving.

It should be appreciated that FIG. 1 is only intended to illustrate the structure and function of the environment 100 for exemplary purposes, and not intended to imply any limitation on the scope of the present disclosure. Embodiments of the present disclosure may also be applied to environments having different structures and/or functions.

The working principle of the computing device 120 shown in FIG. 1 will be further described in detail below with reference to the figures.

Figure 2:
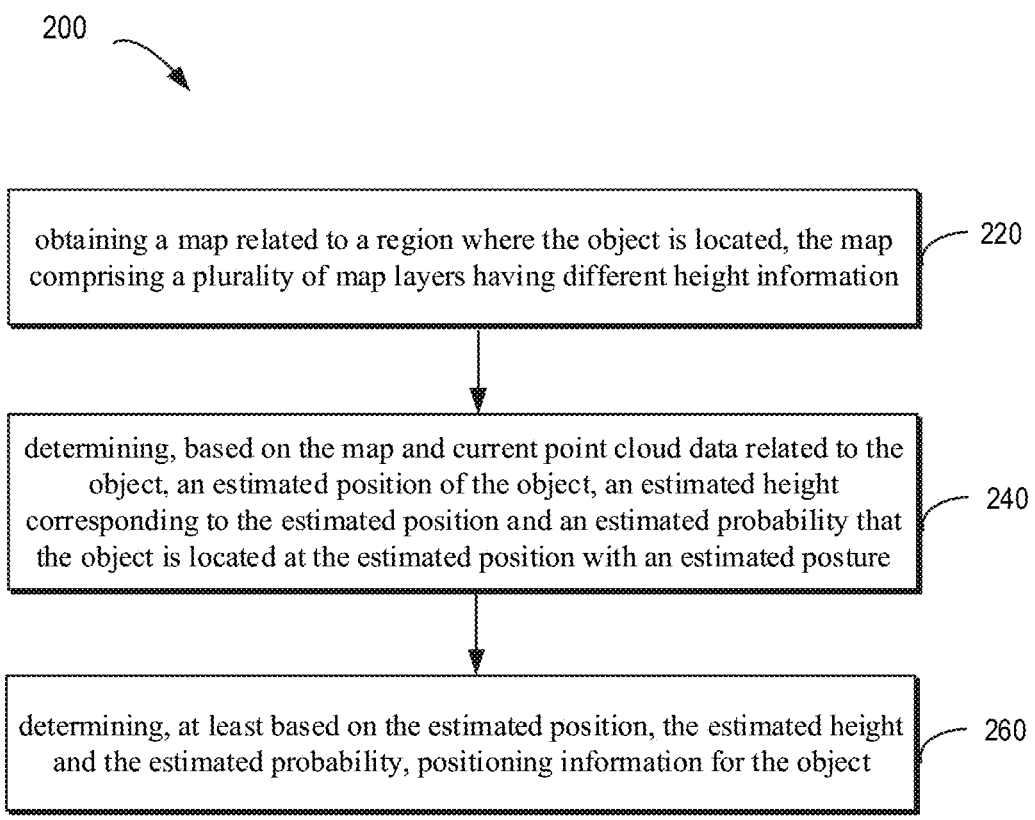
FIG. 2 shows a flowchart of a method 200 for positioning an object according to some embodiments of the present disclosure.

FIG. 2 shows a flowchart of a method 200 for positioning an object according to some embodiments of the present disclosure. For example, the method 200 may be performed by the computing device 110 as shown in FIG. 1. Actions of the method 200 will be described in detail below with reference to FIG. 1. It should be understood that the method 200 may further include additional actions not shown and/or the actions as shown may be omitted. The scope of the present disclosure is not limited in this regard. It should also be understood that specific numerical values for various parameters used in the following embodiments are only used to describe the present disclosure rather being a specific limitation to the present disclosure. Those skilled in the art may set other specific numerical values for various parameters based on actual need.

At block 220, the computing device 120 obtains a map related to the region where the object is located. The map includes a plurality of map layers having different height information.

In some embodiments, the map 101 may be generated based on historical point cloud data in advance, and then be stored, in the form of a multi-layer grid, in a storage apparatus. The storage apparatus is coupled to the computing device 120, or is remote from the computing device 120. The format for storing the data in the map may be multiple single Gaussian models for corresponding multi-layer grids. In other words, the map 101 establishes a Gaussian model map for a plurality of different height ranges that is of multiple height layers and of grids. The computing device 120 may obtain the map 101 from the storage apparatus. Hereinafter, the manner of generating the map 101 will be described in detail with reference to FIGS. 3 and 4.

At block 240, the computing device 120 determines, based on the map and current point cloud data related to the object, an estimated position of the object, an estimated height corresponding to the estimated position and an estimated probability that the object is located at the estimated position with an estimated posture.

In some embodiments, the computing device 120 determine an estimated probability that the object is at an estimated position (x, y) with an estimated posture h by using a probability determining module such as a three-dimensional histogram filter, where the three dimensions refer to three dimensions corresponding to three parameters, and do not necessarily refer to the three-dimensional space in the normal sense. Herein, "the object is located at the estimated position with an estimated posture" may also be simply referred to as a "state", and the "estimated probability" may also be referred to as "posterior probability". The computing device 120 determines the estimated probabilities for multiple states (x, y, h) by using the histogram filter, where x, y indicate coordinates on a two-dimensional plane respectively, and h indicates a heading angle. In one example, the interval between x or y of multiple states may be set to 0.125 m for a positioning resolution with high accuracy.

In general, the use of the histogram filter by the computing device 120 includes two processes, namely, motion update and measurement update, which are used to determine the estimated probabilities of respective states. Hereinafter, a manner of determining the estimated probabilities of the states will be described in detail with reference to FIGS. 5 to 8.

In some embodiments, the computing device 120 determines at least one (e.g., one or two) map layers from a plurality of map layers, based on a predetermined height of the estimated position and height information of the plurality of map layers. The predetermined height is within a height range associated with the at least one map layer. The computing device 120 then determines the estimated height based on the predetermined height and the height information of the at least one map layer. In this manner, the computing device 120 may obtain, from a corresponding map unit of the map by utilizing accurate height information (e.g., height values of points on the ground) stored in a single Gaussian model map having multiple layers (corresponding to multiple height ranges), an accurate estimated height z corresponding to two-dimensional coordinates (x, y). Hereinafter, a method of determining the estimated height will be described in detail with reference to FIG. 6.

At block 260, the computing device 120 determines the positioning information of the object based at least on the estimated position, the estimated height and the estimated probability. The positioning information indicates at least one of: a current position of the object, a current height of the object and a current posture of the object.

In this manner, the computing device 120 may determine the state and the posterior probability corresponding to the state. The posterior probability indicates the likelihood that the object is in the state. Based on such information, the computing device 120 may then obtain accurate positioning information on the object in a scene with complex height information.

In some embodiments, the computing device 120 may obtain a further estimated position of the object, a further estimated height corresponding to the further estimated position, and a further estimated probability that the object is located at the further estimated position with a further estimated posture. Then, the computing device 120 determines the positioning information by performing at least one of: determining the current position of the object based on the estimated position and the estimated probability and the further estimated position and the further estimated probability; determining the current height of the object based on the estimated height and the estimated probability and the further estimated height and the further estimated probability; and determining the current posture of the object based on the estimated posture and the estimated probability and the further estimated posture and the further estimated probability.

In this manner, the computing device 120 may determine the position $(\hat{x}, \hat{y})$, the heading angle $\hat{h}$ and the height $\hat{z}$ of the object by a weighted average method based on multiple estimated positions, multiple estimated heights and multiple estimated probabilities.

In some embodiments, the computing device 120 determines an estimated probability for each of multiple states, and then determines a state having an estimated probability higher than a predetermined threshold. The estimated probabilities of the multiple states obtained by using the histogram filter may form a probability distribution. In one example, the computing device 120 may determine one state having a maximum estimated probability (a point having the largest response in the probability distribution). The computing device 120 then uses all (for example, $11^3$) states (x, y, h) in a region R near the one state (e.g., a region comprising (x±5, y±5, h±5), where 5 represents a unit, rather than representing actual values of the coordinates), heights z corresponding to the states and estimated probabilities corresponds to the states, to calculate the current position, current height and current posture ($\hat{x}$, $\hat{y}$, $\hat{z}$, $\hat{h}$) of the object through the following Equation (1):

$$\hat{x} = \frac{\sum_{(x,y,h)\in R} P'(x, y, h,)^\beta \cdot x}{\sum_{(x,y,h)\in R} P'(x, y, h,)^\beta},$$

$$\hat{y} = \frac{\sum_{(x,y,h)\in R} P'(x, y, h,)^\beta \cdot y}{\sum_{(x,y,h)\in R} P'(x, y, h,)^\beta}.$$

$$\hat{z} = \frac{\sum_{(x,y,h)\in R} P'(x, y, h,)^\beta \cdot z}{\sum_{(x,y,h)\in R} P'(x, y, h,)^\beta}.$$

$$\hat{h} = \frac{\sum_{(x,y,h)\in R} P'(x, y, h,)^\beta \cdot h}{\sum_{(x,y,h)\in R} P'(x, y, h,)^\beta}.$$

where (x, y, h) represents states (i.e., being located at the estimated position x, y with the estimated posture h) in the region R, z represents the heights corresponding to the states, and P' (x, y, h) represents the estimated probabilities of the states (x, y, h) (a posteriori probability, which may be obtained using Equation (11) which will be described in detail below). β may be an empirical value, or a predetermined value, or may be determined according to a matching degree between the current point cloud data and the map (for example, β may be set to 1.1), for adjusting the smoothness of the probability distribution.

In this manner, a positioning having a high accuracy (for example, centimeter-level) in scenarios with complex height information (for example, overpass/multi-layer road scenarios) may be achieved according to embodiments of the present disclosure.

Figure 3:
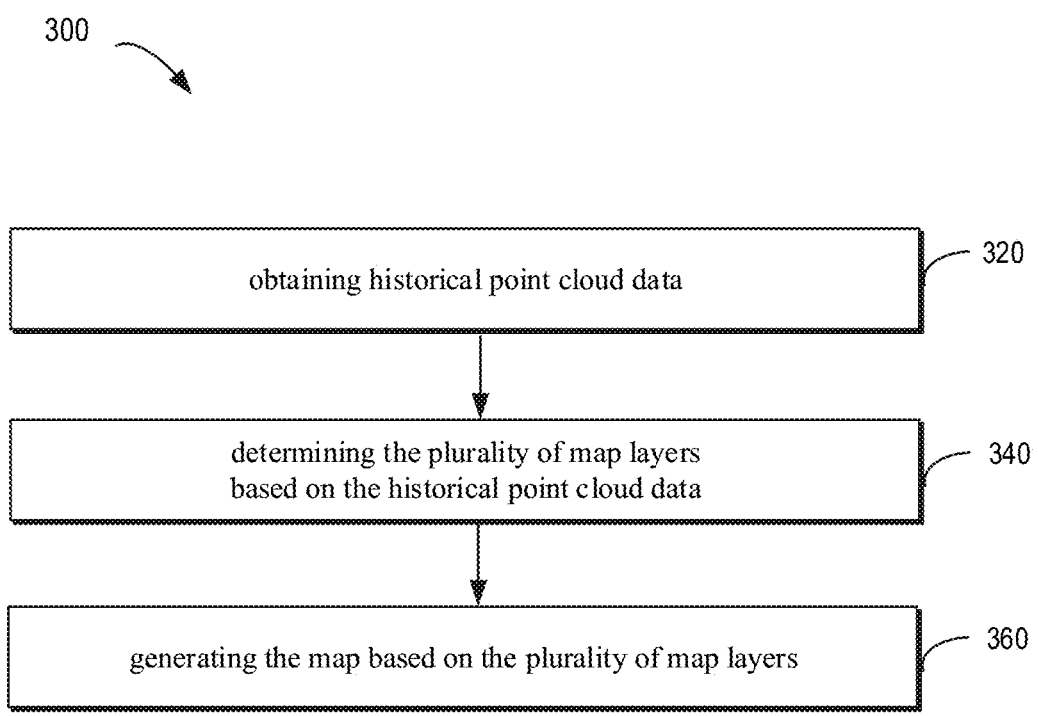
FIG. 3 shows a flowchart of a method 300 for acquiring a map according to some embodiments of the present disclosure.

FIG. 3 shows a flowchart of a method 300 for acquiring a map according to some embodiments of the present disclosure. For example, the method 300 may be considered as an example implementation of block 220 in the method 200 as shown in FIG. 2. It should be appreciated that the method 300 may further include additional actions not shown and/or the actions as shown may be omitted. The scope of the present disclosure is not limited in this regard. Specific numerical values for various parameters used in the following embodiments are only used to describe the present disclosure, rather than being specific limitations to the present disclosure. Those skilled in the art may set other specific numerical values for various parameters based on actual need.

At block 320, the computing device 120 obtains historical point cloud data related to the region which is collected in an historical time period.

Generally, a map having multiple map layers needs to be established in advance based on historical point cloud data (for example, point cloud data that is collected by a test vehicle equipped with LiDAR at a different historical time instant). The method of collecting historical point cloud data may be similar to the conventional method. For example, the historical point cloud data may be obtained by performing a scan for a predetermined region (for example, driving on an overpass road) at different historical time instant (for example, in different seasons, or under different weather conditions).

At block 340, the computing device 120 determines a plurality of map layers based on the historical point cloud data. Each of the plurality of map layers includes a plurality of map units, and each map unit includes spatial parameters for establishing a single Gaussian model and ground parameters.

The historical point cloud data obtained through collection has multiple data points, each of the data points corresponds to a point (representing a spatial position) in a conventional three-dimensional spatial coordinate system, and each of the data points may be positioned in a specific map unit (this specific map unit also corresponds to a position in a two-dimensional plane, for example, x, y in a three-dimensional spatial coordinate system, or a position in a world geodetic coordinate system) in a specific layer in the map (each map layer corresponds to a specific height range). As a result, the map according to an embodiment of the present disclosure is a grid map having a plurality of map layers. Since each map unit in each layer in the map is established based on a single Gaussian model, the computing device 120 may conveniently store, by using multiple single Gaussian models, spatial parameters such as height information and reflection information as being associated with corresponding map units in corresponding layers.

Figure 4:
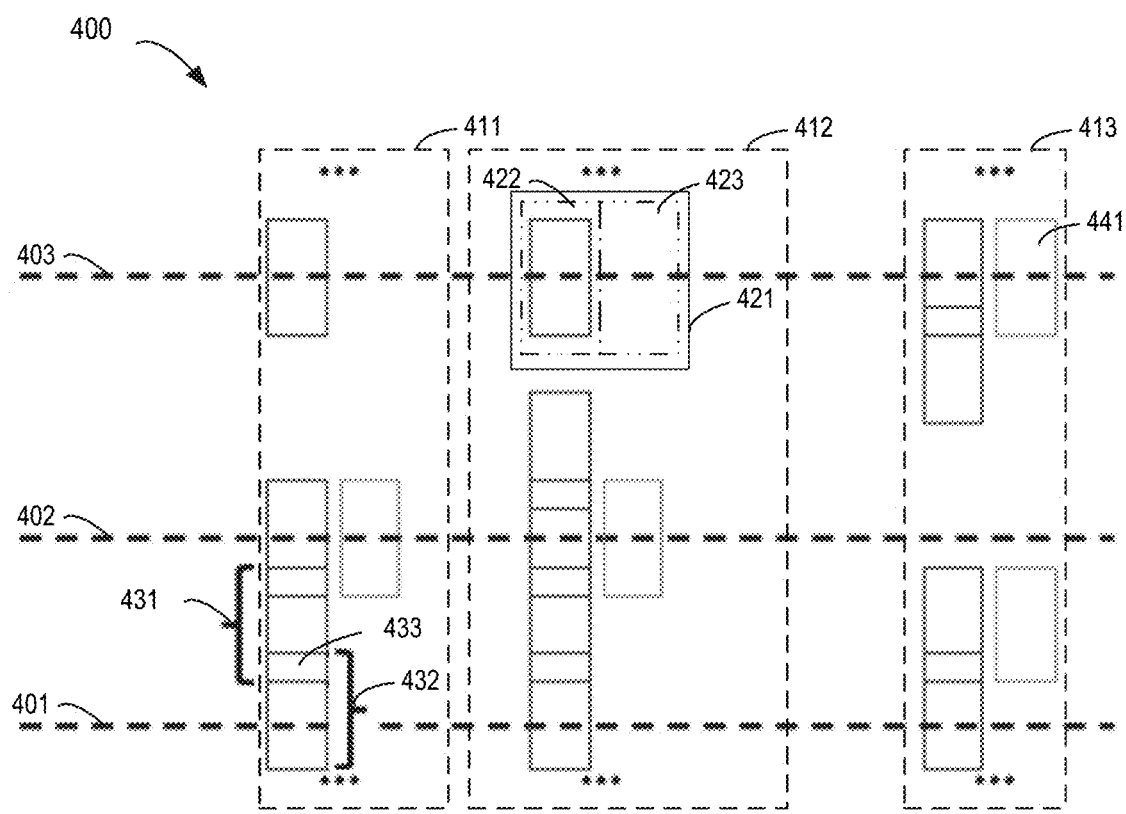
FIG. 4 shows a schematic diagram of a multi-layer single Gaussian model map 400 according to some embodiments of the present disclosure.

FIG. 4 shows a schematic diagram of a multi-layer single Gaussian model map 400 according to some embodiments of the present disclosure. Specific numerical values for various parameters used in the following embodiments are only used to describe the present disclosure, rather than being a specific limitation to the present disclosure. Those skilled in the art may set other specific numerical values for various parameters based on actual need.

In the map 400 shown in FIG. 4, map layers 401, 402 and 403 correspond to three different heights respectively, where the map layer 401 is the $k^{th}$ map layer counted from a reference map layer, the map layer 402 is the $k+2^{th}$ map layer counted from the reference map layer, and the map layer 403 is the $k+5^{th}$ map layer counted from the reference map layer. It may be understood that other map layers exist between the map layers 401 and 402, and between the map layers 402 and 403. Similarly, grids 411, 412 and 413 correspond to three different two-dimensional plane positions (x, y) respectively, and the definition of the grid is similar to that in the conventional grid map, and therefore it will not be repeated herein.

An intersection of one map layer and one grid defines one map unit. For example, an example map unit 421 is at the intersection of the map layer 403 and the grid 412. The map unit 421 includes two sub-units, namely, a Gaussian model sub-unit 422 and a ground parameter sub-unit 423.

The map unit may at least include a reflection information single Gaussian model and a height information single Gaussian model which are established based on the spatial parameters of the points. For example, for the map unit 421, the reflection information single Gaussian model is established based on reflection information of points located within a corresponding grid 412 of a corresponding map layer 403, and the height information single Gaussian model is established based on height information of the points located within the corresponding grid 412 of the corresponding map layer 403. The reflection information includes a mean value Ur of reflection values, a variance $\sigma_\tau$ of the reflection values, and the number Cr of points. The height information includes a mean value $u_a$ of height values, a variance $\sigma_\alpha$ of the height values, and the number Ca of points. The above-mentioned reflection information single Gaussian model and height information single Gaussian model may be correspondingly stored in the Gaussian model sub-unit 422 of the map unit 421.

The map unit may further include height information of a ground point (for example, a point on an overpass road) that is located within the map unit.

For example, the map unit 421 further includes a ground parameter subunit 423, which may store ground parameters of ground points in the corresponding grid 412 of the corresponding map layer 403. The ground parameters include a mean value $u_{ae}$ of height values of the ground points located within the map unit 421, and the number d of ground points located on this map unit. As shown in FIG. 4, at a spatial position corresponding to the map unit 421, there is no ground parameters (that is, there is no data stored in the ground parameter subunit 422), which may indicate that there is no road surface at a spatial position corresponding to the map unit 421. In a case where a road surface exists at a position corresponding to the ground unit, the ground parameter sub-unit (for example, the sub-unit 441) stores height information of the corresponding road surface.

Similarly, there is no spatial parameter (Gaussian model sub-unit) in a map unit corresponding to the grid 413 and at the map layer 402, since there is no corresponding historical point cloud data at this position. This may mean that the spatial position corresponding to the map unit is blocked by a tree or a building. In some embodiments, in order to save storage space, the computing device 120 only allocates storage space for valid (i.e., having corresponding data) map layers (map units and/or map subunits).

There is a certain height overlapping region between every two map layers corresponding to two adjacent height ranges. For example, in FIG. 4, there is a height overlapping region 433 between Gaussian model subunits 431 and 432 adjacent to each other in the height direction. The height overlapping region 433 representing a height range corresponding to the height information included in the Gaussian model sub-unit 431 is partially the same as a height range corresponding to the height information included in the Gaussian model sub-unit 432. The existence of the overlapping region may reduce the effect of height errors on the positioning accuracy, and information of points in three-dimensional space may be used to a larger extent. Such information may be used for example in a process for determining the estimated height described in detail with reference to FIG. 6.

In some cases, if a point (x, y, z) in the three-dimensional spatial coordinate system located within a height range for example represented by the height overlapping region 433, the point (x, y, z) may correspond to two map layers.

In some embodiments, a map layer matching the point (x, y, z) in the three-dimensional spatial coordinate system may be determined by the following Equation (2) and Equation (3):

$$L = \begin{cases} \{l_1, l_2\}, \Delta h < h_o \\ \{l_1\}, \Delta h \geq h_o \end{cases} \quad (2)$$

$$l_1 = \left\lfloor \frac{z - a_b}{h_l - h_o} \right\rfloor, \quad (3)$$

$$l_2 = l_1 - 1,$$

$$\Delta h = (z - a_b) - (h_l - h_o) \cdot l_1$$

where x and y represent the position of the point in space, z represents the height of the point in space, L represents a set of map layers corresponding to point (x, y, z), and $l_1$ and $l_2$ represent indices of candidate map layers, where the index may indicate positions of the candidate map layers in the map (for example, the number of layers counted from the reference layer). $\Delta h$ represents the height of the point (x, y, z) in the $l_1$ layer (i.e., the distance from a bottom of $l_1$ to the point). $h_l$ represents a height of each map layer, $h_o$ represents a height of an overlapping portion between the two map layers, and $a_b$ represents a reference height value for calculating the indices of the candidate map layers.

In one example, $h_l$ may be set to 2.5 m, $h_o$ may be set to 1 m, and $a_b$ may be set to −1000 m. In this manner, the computing device 120 may determine (one or two) map layers that match points in the historical point cloud data.

Returning to FIG. 3, at block 360, the computing device 120 generates a map based on the plurality of map layers. This map is further used in the processing as shown at block 240. As discussed above, the generated map is stored in a storage apparatus coupled to or being remote from the computing device 120, and may be utilized and/or updated by the computing device 120.

An advantage of the map based on the single Gaussian model is that the map data may be conveniently updated. For example, for the sub-unit 432 at the layer 401 of the grid 411 in FIG. 4, it is assumed that a single Gaussian model has been previously established based on point cloud data obtained from 5 times of scanning by LiDAR, that is, the Gaussian model is established based on 5 data points. If the point cloud data collected in a recent ($6^{th}$) scan of LiDAR include data points for the unit 432, the single Gaussian model for the unit 432 may be reestablished (updated) by using the $6^{th}$ data point together with the previous 5 data points.

In an example, where appropriate, the current point cloud data may also be used to update the map. The computing device 120 may update the map according to the following process. First, the computing device 120 may select a set of map layers from the plurality of map layers based on height information of the current point cloud data, and height information of the set of map layers matches the height information of the current point cloud data. The computing device 120 may use Equations (2) and (3) to determine a set of map layers (e.g., one or two map layers) corresponding to the point cloud data. The computing device 120 then determines, in the set of map layers, map units corresponds to the current point cloud data. Next, the computing device 120 updates Gaussian models of the map units corresponding to the current point cloud data based on the current point cloud data. Through the above process, the computing device 120 may update the single Gaussian model of the map unit by using new point cloud data.

The multi-layer single Gaussian model map according to embodiments of the present disclosure has the following advantages. As compared with a conventional map, the multi-layer single Gaussian model stores richer and more accurate height information in height layers in the height direction. In addition, the data in the map is stored in the form of multiple single Gaussian models, which reduces the amount of data storage and facilitates map updating when appropriate.

Figure 5:
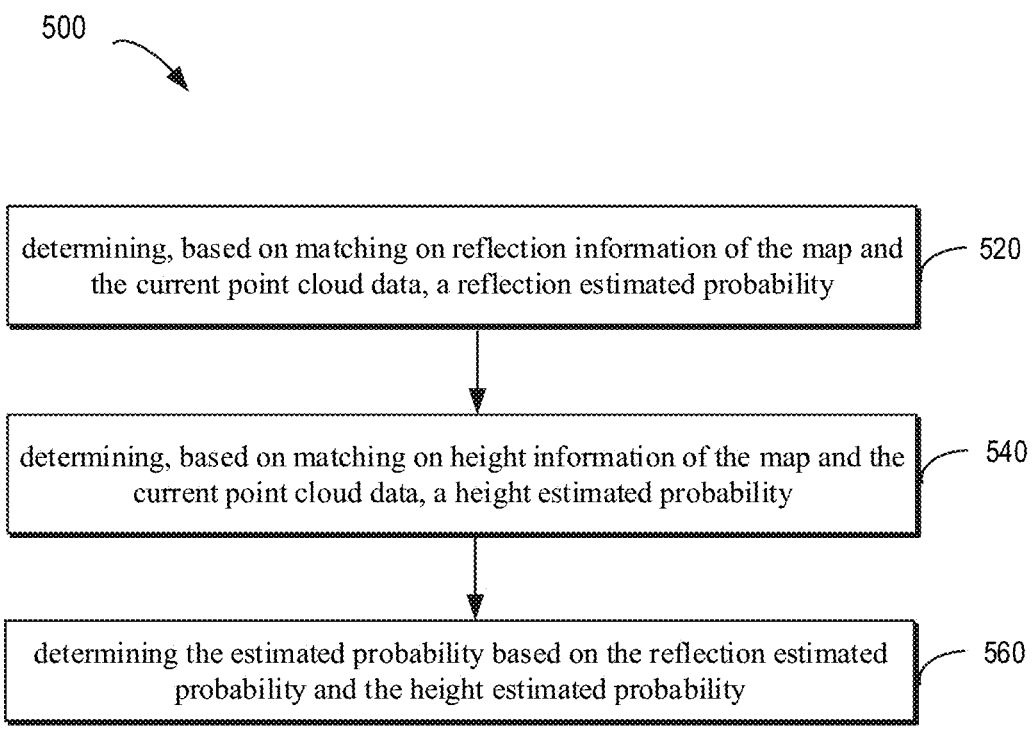
FIG. 5 shows a flowchart of a method 500 for determining an estimated probability according to some embodiments of the present disclosure.

FIG. 5 shows a flowchart of a method 500 for determining an estimated probability according to some embodiments of the present disclosure. For example, the method 500 may be considered as an example implementation of block 240 in method 200 as shown in FIG. 2. It should be understood that the method 500 may further include additional actions not shown and/or the actions as shown may be omitted. The scope of the present disclosure is not limited in this regard. Specific numerical values for various parameters used in the following embodiments are only used to describe the present disclosure, rather than being a specific limitation to the present disclosure. Those skilled in the art may set other specific numerical values for various parameters as needed.

At block 520, the computing device 120 determines a reflection estimated probability that the object is at the estimated position with an estimated posture based on reflection information contained in the plurality of map layers and reflection information of the current point cloud data.

In some embodiments, the computing device 120 may determine the reflection estimated probability $P(\mathcal{Z}_\tau | x, y, h, \mathcal{M})$ based on a process described below.

First, the computing device 120 may determine a first dataset in the current point cloud data based on height information of one map layer selected from the plurality of map layers. The height information of the first dataset corresponds to the height information of the selected one map layer.

Then, the computing device 120 determines a layer reflection information similarity $Dis_r(x, y, h, l)$ based on at least reflection information contained in the first dataset and reflection information contained in the map layer. The layer reflection information similarity indicates the similarity between the reflection information of the current point cloud data and the reflection information of the map in the map layer l, which may be calculated according to the following Equation (4):

$$Dis_r(x, y, h, l) = \sum_{i,j} \frac{(r_{m(i-x,j-y,l)} - r_{zh(i,j,l)})^2}{\sigma^2_{m(i-x,j-y,l)} + \sigma^2_{z(i,j,l)}} \quad (4)$$

where $r_m$ represents a mean value of reflection values of points in map layer l, and $\sigma_m^2$ represents a variance of the reflection values of the points in the map layer l. $r_{zh}$ represents a mean value of reflection values of points in the first dataset, and $\sigma_z^2$ represents a variance of the reflection values of the points in the first dataset. i and j are used to indicate positions of the points in the point cloud data.

Next, the computing device 120 determines a reflection estimated probability (likelihood probability) $P(\mathcal{Z}_\tau | x, y, h, \mathcal{M})$ at least based on the layer reflection information similarity $Dis_r(x, y, h, l)$.

Figure 7:
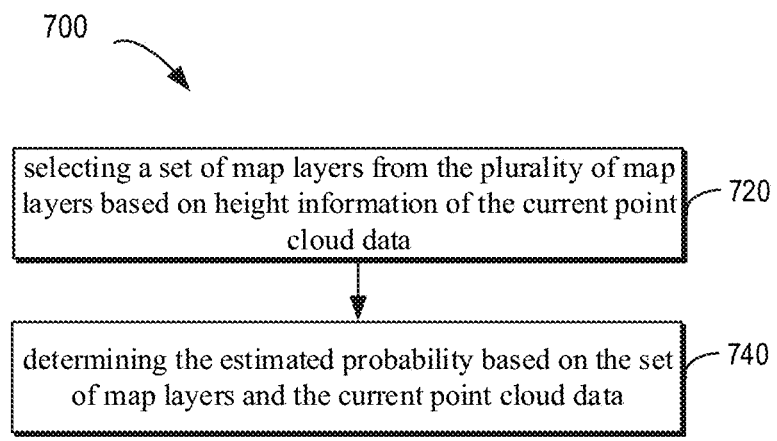
FIG. 7 shows a flowchart of a method 700 for determining an estimated probability according to some embodiments of the present disclosure.
Figure 8:
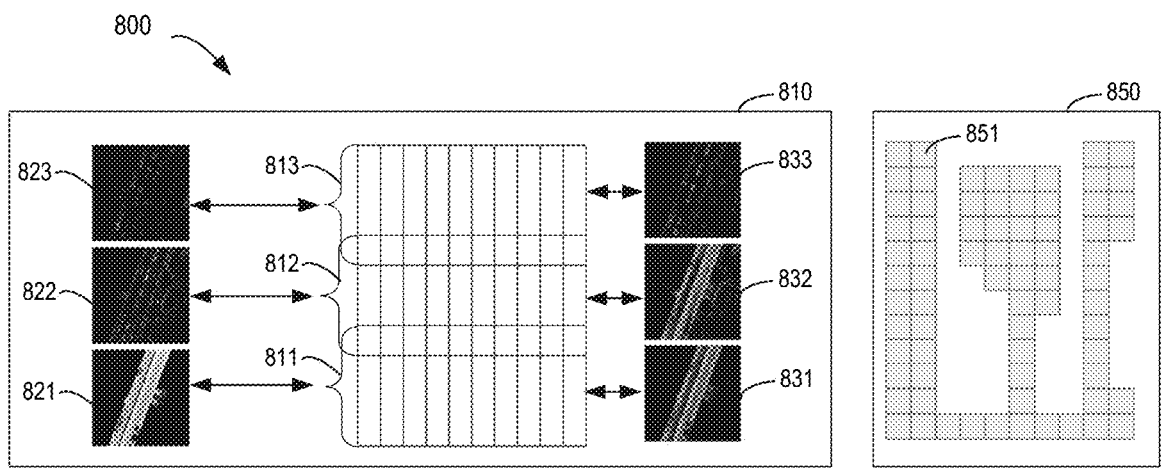
FIG. 8 shows a schematic diagram 800 illustrating a pre-processed multi-layer single Gaussian model map and a pre-processed current point cloud data according to some embodiments of the present disclosure.

In an example, the computing device 120 may determine the reflection estimated probability $P(\mathcal{Z} | x, y, h, \mathcal{M})$ according to the following Equation (5):

$$P(\mathcal{Z}_r | x, y, h, \mathcal{M}) = \eta \cdot \prod_l \alpha^{-\frac{Dis_r(x,y,h,l)}{2N}}. \quad (5)$$

where $\mathcal{Z}_\tau$ represents the reflection information in the current point cloud data, (x, y, h) represents the state, that is, the object is located at the estimated position with the estimated posture, $\mathcal{M}$ represents the map obtained at block 220, and Π represents a multiplication operation. η represents a normalization operation, and l indicates a map layer selected in a set of map layers L based on a predetermined policy, and the specific selection process will be described in detail below with reference to FIG. 7. α is a parameter for adjusting a contrast between states in the histogram, and N is the number of voxels which are included in the set of map layer L, and are within the current point cloud data (the details of which will be described below with reference to the embodiment of FIG. 8).

At block 540, the computing device 120 determines a height estimated probability that the object is located at an estimated position with an estimated posture, based on the height information contained in the plurality of map layers and height information contained in the current point cloud data.

In some embodiments, the computing device 120 may determine a height estimated probability $P(\mathcal{Z}_\alpha | x, y, h, \mathcal{M})$ based on a process described below.

First, the computing device 120 may determine a first dataset in the current point cloud data based on height information of one map layer selected from the plurality of map layers. The height information of the first dataset corresponds to the height information of the selected one map layer.

Then, the computing device 120 determines a layer height information similarity $Dis_\alpha(x, y, h, l)$ at least based on the height information contained in the first dataset and the height information contained in the one map layer. The layer height information similarity indicates the similarity between the height information of the current point cloud data and the height information of the map at the map layer l, which may be calculated according to the following Equation (6):

$$Dis_\alpha(x, y, h, l) = \sum_{i,j} (a_{m(i-x,j-y,l)} - a_{zh(i,j,l)})^2 \quad (6)$$

where $\alpha_m$ represents a mean value of height values of points in the map layer l, $\alpha_{zh}$ represents a mean value of height values of points in the first dataset, and i and j are used to represent positions of points in the point cloud data.

Next, the computing device 120 determines a height estimated probability (likelihood probability) $P(\mathcal{Z}_\alpha | x, y, h, \mathcal{M})$ at least based on the layer height information similarity $Dis_\alpha(x, y, h, l)$.

In an example, the computing device 120 may determine the reflection estimated probability $P(\mathcal{Z}_\alpha | x, y, h, \mathcal{M})$ according to the following Equation (7):

$$P(\mathcal{Z}_a \mid x, y, h, \mathcal{M}) = \eta \cdot \prod_l \alpha^{-\frac{\lambda Dis_a(x,y,h,l)}{2N}}. \quad (7)$$

where $\mathcal{Z}_\alpha$ represents the height information in the current point cloud data, (x, y, h) represent the state, that is, the object is located at the estimated position with the estimated posture, $\mathcal{M}$ represents the map obtained at block 220, and represents a multiplication operation. η represents a normalization operation, and Π indicates a map layer in a set of map layers L selected based on a predetermined policy, and a specific selection process will be described in detail below with reference to FIG. 7. α represents a parameter for adjusting the contrast between states in the histogram, and N is the number of voxels which are included in the set of map layer L and are of the current point cloud data (the definition of voxel will be stated in detail below with reference to FIG. 8). Both λ and α may be determined based on a matching degree between the point cloud data and the map.

At block 560, the computing device 120 determines an estimated probability at least based on the reflection estimated probability and the height estimated probability.

In some embodiments, the computing device 120 may at least use the reflection estimated probability and the height estimated probability to determine the estimated probability $P(x, y, h \mid \mathcal{Z}, \mathcal{M})$ based on a process described below.

First, the computing device 120 determines a motion update prediction probability $\overline{P}(x, y, h)$ for the state (x, y, h). The whole process of determining the motion update prediction probability is also referred to as a motion update.

Since the positioning method of the moving object is performed in real time, the computing device determines positioning information (i.e., corresponding to one frame of point cloud data) for a moving object at a predetermined time interval. In this manner, the computing device 120 may roughly estimate positioning information at a current time instant t according to positioning information determined at a previous time instant t−1.

For example, assuming $x_t = (x, y, z, h)^T$ is the positioning information at the time instant t (that is, a center point of the histogram filter at the time instant t), the computing device 120 may obtain $x_t$ by using the positioning information $x_{t-1}$ at the time instant t−1 (that is, a center point of the histogram filter at the time instant t−1), and a state increment of a strapdown inertial navigation system from time t−1 to time t (including increment of position, height, and heading angle). The center point may refer to a middle state among a plurality of candidate states (x, y, z, h). In an example, the center point may be obtained by averaging x, y, z, and h, respectively.

In an example, the computing device 120 may determine predicted probability $\overline{P}(x, y, h)$ of each state (x, y, h) according to the following Equation (8):

$$\overline{P}(x, y, h) = \eta \cdot \sum_{i,j,k} P(i, j, k) \cdot \exp\left(-\frac{(i-x)^2 + (j-y)^2 + (k-h)^2}{2\sigma^2}\right) \quad (8)$$

where P(i, j, k) represents the motion update probability, and σ is a parameter indicative of a movement degree of the object after the motion update is performed.

Then, the computing device 120 determines the likelihood probability for each state (x, y, h) using the reflection estimated probability and the height estimated probability as determined at above blocks 520 and 540. In an example, the computing device 120 may determine the likelihood probability $P(\mathcal{Z} \mid x, y, h, \mathcal{M})$ of the state (x, y, h) according to the following Equation (9):

$$P(\mathcal{Z} \mid x,y,h, \mathcal{M}) = \eta \cdot P(\mathcal{Z}_r \mid x,y,h, \mathcal{M})^{w_r} \cdot P(\mathcal{Z}_\alpha \mid x,y,h, \mathcal{M})^{1-w_r} \quad (9)$$

where $\mathcal{Z}$ represents the current point cloud data, η represents a normalization operation, iv, represents a weight for adjusting an influence of the reflection estimated probability and h an influence of eight estimated probabilities on the final estimated probability. The detailed determining process of iv, will be further described below.

Next, the computing device 120 calculates a priori probability P (x, y, h) by using the motion update prediction probability and a KL (Kullback-Leiblerdivergence) divergence between the likelihood probability distribution $\Sigma_{xyh} P(\mathcal{Z} \mid x, y, h, \mathcal{M})$: and the motion update prediction probability distribution $\Sigma_{xyh} \overline{P}(x, y, h)$. In an example, the computing device 120 may determine the priori probability according to the following Equation (10).

$$P(x,y,h) = \overline{P}(x,y,h)^{1/K} \quad (10)$$

where K is the KL divergence.

Finally, the computing device 120 may determine the estimated probability (posterior probability) of the state (x, y, h) based on the priori probability P (x, y, h) of the state (x, y, h) and the likelihood probability $P(\mathcal{Z} \mid x, y, h, \mathcal{M})$, where the likelihood probability is determined based on the reflection estimated probability and the height estimated probability.

In an example, according to Bayes' rule, the computing device 120 may determine the estimated probability according to the following Equation (11): where represents the normalization operation.

$$P(x,y,h \mid \mathcal{Z}, \mathcal{M}) = \eta \cdot P(\mathcal{Z} \mid x,y,h, \mathcal{M}) \cdot P(x,y,h) \quad (11)$$

where η represents the normalization operation.

The entire process of determining the estimated probability (the posteriori probability) may also be referred to as a measurement update.

In some embodiments, the computing device 120 may adjust the influence of the reflection estimated probability and the influence of the height estimated probability on the final estimated probability by adjusting the weight $w_r$, for the reflection estimated probability and the height estimated probability. For example, in a scenario having road markings, a match between the reflection information in the map and the reflection information in the point cloud data is more accurate. In such a scenario, the computing device 120 may increase the value of $w_r$, so that the reflection estimated probability $P(\mathcal{Z}_r \mid x, y, h, \mathcal{M})$ has a higher weight. In a scenario having buildings, a match between the height information in the map and the height information in the point cloud data is more accurate. In such a scenario, the computing device 120 may lower the value of $w_r$, so that the height estimated probability $P(\mathcal{Z}_\alpha \mid x, y, h, \mathcal{M})$ has a higher weight.

In an example, the computing device 120 may dynamically and autonomously adjust the weight iv, according to a probability distribution $\Sigma_{xyh} P(z_r \mid x, y, h, m)$ and the variance of $\Sigma_{xyh} P(z_\alpha \mid x, y, h, m)$, by using the following Equation (12):

$$\omega_r = \frac{\sigma_x^2(a) + \sigma_y^2(a) + \sigma_h^2(a)}{(\sigma_x^2(a) + \sigma_y^2(a) + \sigma_h^2(a)) + (\sigma_x^2(r) + \sigma_y^2(r) + \sigma_h^2(r))} \quad (12)$$

The variances in the three dimensions of x, y, and h in the above Equation (12) may be calculated using the following Equation (13):

$$\sigma_x^2 = \frac{\sum_{xyh} P(x, y, h)^\beta (x - \bar{x})^2}{\sum_{xyh} P(x, y, h)^\beta}.$$

$$\sigma_y^2 = \frac{\sum_{xyh} P(x, y, h)^\beta (y - \bar{y})^2}{\sum_{xyh} P(x, y, h)^\beta}.$$

$$\sigma_h^2 = \frac{\sum_{xyh} P(x, y, h)^\beta (h - \bar{h})^2}{\sum_{xyh} P(x, y, h)^\beta}.$$

(13)

where $(\bar{x}, \bar{y}, \bar{h})$ is a centroid of a corresponding probability distribution, $\beta$ is a parameter that controls the smoothness of the distribution, and $P(x, y, h)$ represents a posterior probability of a corresponding state. In one embodiment, the centroid may be determined according to a weighted average method similar to Equation (1).

Figure 6:
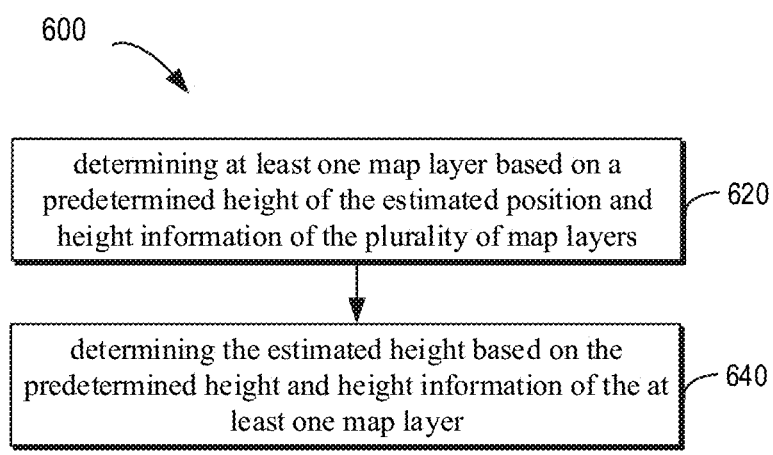
FIG. 6 shows a flowchart of a method 600 for determining an estimated height according to some embodiments of the present disclosure.

FIG. 6 shows a flowchart of a method 600 for determining an estimated height according to some embodiments of the present disclosure. For example, the method 600 may be considered as an example implementation of block 240 in the method 200 as shown in FIG. 2. It should be understood that the method 600 may further include additional actions not shown and/or the actions as shown may be omitted. The scope of the present disclosure is not limited in this regard. Specific numerical values for various parameters used in the following embodiments are only used to describe the present disclosure, rather than a specific limitation to the present disclosure. Those skilled in the art may set other specific numerical values for various parameters based as needed.

At block 620, the computing device 120 determines at least one map layer from the plurality of map layers based on a predetermined height of the estimated position and the height information of the plurality of map layers, the predetermined height being within a height range associated with the at least one map layer.

In some examples, the computing device 120 may determine, based on an estimated position (x, y) and a predetermined ground height value $z_g$ by using the above Equations (2) and (3), a grid corresponding to the estimated position in the map and an index of the candidate map layer (or a set of candidate map layers). The computing device 120 may predict the predetermined ground height value $z_g$ through various methods. In some examples, the computing device may predict the predetermined ground height value $z_g$ by using the height value of the previous time instant t−1.

At block 640, the computing device 120 determines the estimated height based on the predetermined height and the height information of the at least one map layer.

As discussed above with reference to FIG. 3 and FIG. 4, the map unit in the map includes ground parameters, and the ground parameters include a mean value $u_{ae}$ of height values of ground points within the map unit. The computing device 120 may determine the final estimated height by using the relationship between the $u_{ae}$ corresponding to the corresponding map unit(s) and the predetermined ground height value $z_g$. For example, the computing device 120 may determine different estimated heights based on the predetermined height value ($z_g$) and height information ($u_{ae}$) of at least one map layer in different manner for the following cases.

Case 1: In some embodiments, in a case that (1) there is only one candidate map layer $l_1$; and (2) a map unit corresponding to both a grid (x, y) and the candidate map layer $l_1$ includes the ground parameters (i.e., the ground parameter subunit contains data); and (3) a difference between the predetermined height value $z_g$ and the mean value $u_{ae}$ of the height values in the ground parameters corresponding to the candidate map $l_1$ is less than a predetermined threshold, the computing device 120 determines the estimated height is equal to $u_{ae}$ in case of the above conditions (1) to (3) are all met.

Case 2: In some other embodiments, in a case that (1) there are two candidate map layers $l_1$ and $l_2$; and (2) map units corresponding to both a grid (x, y) and candidate map layers $l_1$ and $l_2$ include ground parameters (that is, the ground parameter subunit contains data); and (3) a difference d1, which is between the predetermined height value $z_g$ and a mean value $u_{ae}1$ of height values in the ground parameters corresponding to the candidate map layer $l_1$, is less than a difference d2, which is between the predetermined height value $z_g$ and a mean value $u_{ae}2$ of height values in the ground parameters corresponding to the candidate map layer $l_2$ (that is, d1<d2), and (4) the difference between the height values $z_g$ and $u_{ae}1$ are within a certain threshold range, the computing device 120 determines that the estimated height is equal to $u_{ae}1$.

Case 3: In some further embodiments, in a case that (1) there are two candidate map layers $l_1$ and $l_2$; and (2) map units corresponding to both a grid (x, y) and the candidate map layers $l_1$ and $l_2$ include ground parameters (that is, the ground parameter subunit contains data); and (3) a difference d1, which is between the predetermined height value $z_g$ and a mean value $u_{ae}1$ of height values in the ground parameters corresponding to the candidate map layer $l_1$ is not less than a difference d2, which is between the height value $z_g$ and a height value $u_{ae}2$ in the ground parameters corresponding to the candidate map layer $l_2$ (that is, d1≥d2), and (4) the difference between the height values $z_g$ and $u_{ae}2$ are within a certain threshold range, the computing device 120 determines that the estimated height is equal to $u_{ae}2$.

Case 4: In other embodiments, when none of the above cases 1, 2, and 3 are satisfied, the computing device 120 determines that the estimated height is equal to the predetermined height value $z_g$.

In this manner, the computing device 120 may determine an accurate estimated height z for each state (x, y, h) using the mean value $u_{ae}$ of the height values of the ground points. The estimated height z may be further used to accurately determine map layer(s) to which each point in the current point cloud data corresponds.

FIG. 7 shows a flowchart of a method 700 for determining an estimated probability according to some embodiments of the present disclosure. For example, the method 700 may be viewed as an example implementation of block 240 in the method 200 as shown in FIG. 2. It should be appreciated that the method 700 may also include additional actions not shown and/or the actions shown may be omitted. The scope of the present disclosure is not limited in this regard. Specific numerical values for various parameters used in the following embodiments are only used to describe the present disclosure, rather than being a specific limitation to the present disclosure. Those skilled in the art may set other specific numerical values for various parameters as needed.

At block 720, the computing device 120 selects a set of map layers from the plurality of map layers based on height information of the current point cloud data. The height information of the set of map layers matches the height information of the current point cloud data.

For each point in the current point cloud data, the computing device 120 will search the map to find which layers it belongs to. According to the embodiment of the present disclosure, the calculation complexity mainly depends on the number of points in the current point cloud data and the complexity of the map, both of which may affect the calculation of the estimated probability of the states. Therefore, the map including the plurality of map layers needs to be pre-processed. Considering the height range covered by the current point cloud data, the computing device 120 may select some corresponding map layers, which may be used for the subsequent estimated probability determination.

FIG. 8 shows a schematic diagram 800 of a pre-processed multi-layer single Gaussian model map and a pre-processed current point cloud data according to some embodiments of the present disclosure. To reduce the amount of calculation, the computing device 120 may voxelize the current point cloud data 850 into multiple voxels 851. A center point of the voxel 851 may be used to represent an average position of all points located within the voxel. Each voxel 851 includes: height information of the center point, a mean value of reflection values and a variance of the reflection values of points located within the voxel, and the number of the points. Since some spatial positions are occluded by objects such as trees or buildings, some of the voxels corresponding to the current point cloud data 850 do not include any data due to the occlusion.

In some embodiments, the computing device 120 allocates storage space only for valid voxels (i.e., including data). In some embodiments, the computing device 120 may set the size of a voxel to (0.125 m, 0.125 m, 0.125 m) which corresponds to voxel lengths in the x, y, and z directions, respectively.

Since each frame of the current point cloud data only covers a limited height range, in some embodiments, the computing device 120 only maintains a data structure in the map which is for storing the data of a set of map layers near the ground, where the set of map layers has a fixed number of layers. For example, a set of map layers 810 including map layers 811, 812 and 813 is shown in FIG. 8, and its height range matches the height range of the (voxelized) current point cloud data 850. The set of map layers with a fixed number of layers may also be referred to as a region of interest. Subsequently, the computing device 120 uses the set of map layers 810 and the current point cloud data 850 to determine a subsequent estimated probability.

As discussed with reference to FIG. 3 and FIG. 4, the map layers 811, 812 and 813 each include the following information: the mean value of the reflection values, the variance of the reflection values, the mean value of the height values, and the number of corresponding points. With such information, the reflection information Gaussian model and the height information Gaussian model may be established, respectively, and height information visualization and reflection information visualization may be realized for the map layers 811, 812 and 813, respectively. For example, images 821, 822 and 823 are height information visualization results of map layers 811, 812 and 813, respectively, and images 831, 832 and 833 are reflection information visualization results of map layers 811, 812 and 813, respectively.

Returning to FIG. 7, at block 740, the computing device 120 determines the estimated probability based on the set of map layers and the current point cloud data.

Reference may be made to the methods discussed above in connection with FIG. 3 to FIG. 6 for determining the estimated probability, the difference lies in that the map data inputted into the histogram filter. By using the pre-processed simplified map data (which has a number of layers), the computing device 120 may more quickly determine the estimated probability, which may further affect the final positioning accuracy for (e.g., moving) objects.

In some embodiments, the computing device 120 further determines confidence parameters for the set of map layers, the confidence parameters including at least one of: the number of spatial parameters and ground parameters included in the set of map layers, noise data contained in the set of map layers and environmental variables in the set of map layers.

Since the multi-layer single Gaussian model map is generated based on the collected point cloud data, some layers in the multi-layer single Gaussian model map might only contain a few points. The Gaussian model established using such a few points has a lower confidence level. In addition, some map layers may contain a lot of noise data (for example, dynamic obstacles such as vehicles). Further, changes in the environment (for example, changes in leaves caused by season changes) may cause a low similarity between the current point cloud data and certain map layers.

In order to eliminate negative influences caused by the above cases, the computing device determines (e.g., calculates) confidence parameters of the set of map layers, thereby allowing a determination of a map layer that has a positive influence on positioning. The computing device 120 may select at least one map layer from the set of map layers based on the confidence parameters. For example, the confidence parameters of the at least one map layer is greater than a threshold. The computing device 120 may then determine the estimated probability and determine the final positioning information (e.g., the position, height and heading angle) of the object based on the at least one map layer and the current point cloud data.

In some embodiments, for the reflection information, the computing device 120 may select at least one map layer corresponding to the reflection information by using a first confidence parameter (e.g., the reflection information confidence). Similarly, for the height information, the computing device 120 may select at least one map layer corresponding to the height information by using the second confidence parameter (for example, the height information confidence).

In one example, the computing device 120 may determine a reflection information confidence level U (r, l) and a height information confidence level U (α, l) according to the following Equations (14) and (15).

$$P(\mathcal{Z}_r^{(l)} \mid x, y, h, \mathcal{M}) = \eta \cdot \alpha^{-\frac{Dis_r(x,y,h,l)}{2N_z}}. \quad (14)$$

$$P(\mathcal{Z}_a^{(l)} \mid x, y, h, \mathcal{M}) = \eta \cdot \alpha^{-\frac{\lambda Dis_a(x,y,h,l)}{2N_z}}.$$

$$U(r, l) = \sigma_x^2(r, l) + \sigma_y^2(r, l) + \sigma_h^2(r, l). \quad (15)$$

$$U(a, l) = \sigma_x^2(a, l) + \sigma_y^2(a, l) + \sigma_h^2(a, l).$$

where $P(\mathcal{Z}_r^{(l)} \mid x, y, h, \mathcal{M})$ represents a reflection estimated probability for a map layer l, and $P(\mathcal{Z}_a^{(l)} \mid x, y, h, \mathcal{M})$ represents a height estimated probability for the map layer l.

$Dis_r(x, y, h, l)$ and $Dis_\alpha(x, y, h, l)$ represent a reflection information similarity and a height information similarity between the current point cloud data and the map layer l, respectively. Nz represents the number of voxels of the current point cloud data included in a region of interest in the map. $\sigma_x^2(r, l)$, $\sigma_y^2(r, l)$ and $\sigma_h^2(r, l)$ are variances of the reflection estimated probability $P(\mathcal{Z}_r^{(l)}|x, y, h, \mathcal{M})$ distribution in three dimensions x, y, h respectively, where is a probability $P(\mathcal{Z}_r^{(l)}|x, y, h, \mathcal{M})$ for example, in the histogram filter) corresponding to the map layer l, $\sigma_x^2(\alpha, l)$, $\sigma_y^2(\alpha, l)$ and $\sigma_h^2(\alpha, l)$ are variances of the height estimated probability $P(\mathcal{Z}_\alpha^{(l)}|x, y, h, \mathcal{M})$ distribution in three dimensions x, y, h, respectively, where $P(\mathcal{Z}_\alpha^{(l)}|x, y, h, \mathcal{M})$ is a probability (for example, in the histogram filter) corresponding to the map layer l, the above mentioned variances may be determined according to the Equation (13) described above.

In this manner, the computing device may determine the positioning information by only using the estimated position, estimated height and estimated probability corresponding to the map layer that has a positive impact on positioning, so that the accuracy and confidence level of positioning are further improved. Therefore, various issues in the conventional positioning solution can be addressed by the embodiments of the present disclosure. For example, a positioning with high accuracy (centimeter-level) in a variety of scenarios with complex height information (such as overpass/multi-layer road scenarios) may be achieved according to the embodiments of the present disclosure.

Figure 9:
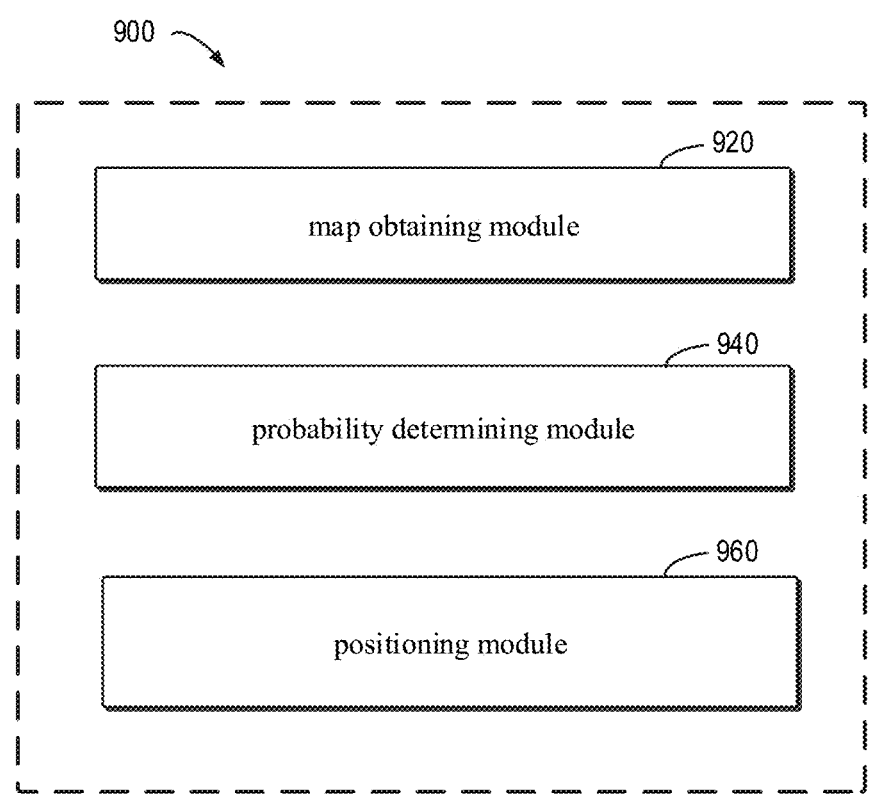
FIG. 9 shows a schematic block diagram of an apparatus 900 for determining positioning information according to an embodiment of the present disclosure.

FIG. 9 shows a schematic block diagram of an apparatus 900 for determining positioning information according to an embodiment of the present disclosure.

As shown in FIG. 9, the apparatus 900 may comprise a map obtaining module 920 configured to obtain a map related to a region where an object is located, the map comprising a plurality of map layers having different height information. The apparatus 900 may further comprise a probability determining module 940 configured to determine, based on the map and current point cloud data related to the object, an estimated position of the object, an estimated height corresponding to the estimated position and an estimated probability that the object is located at the estimated position with an estimated posture. In addition, the apparatus 900 may further comprise a positioning module 960 configured to determine, at least based on the estimated position, the estimated height and the estimated probability, positioning information of the object, the positioning information indicating at least one of the following: a current position of the object, a current height of the object and a current posture of the object.

In some embodiments, the map obtaining module 920 comprises: a historical point cloud data obtaining module configured to obtain historical point cloud data related to the region which is collected during an historical time period; a map unit determining module configured to determine a plurality of map layers based on the historical point cloud data, each map layer of the plurality of map layers comprising a plurality of map units, each map unit comprising spatial parameters for establishing a single Gaussian model and ground parameters; and a map generating module configured to generate a map based on the plurality of map layers.

In some embodiments, the apparatus 900 further comprises: a map layer matching module configured to select a set of map layers from the plurality of map layers based on the height information of the current point cloud data, height information of the set of map layers matching the height information of the current point cloud data; a map unit matching module configured to determine, in the set of map layers, map units corresponding to the current point cloud data; and a map updating module configured to update single Gaussian models of the map units corresponding to the current point cloud data, based on the current point cloud data.

In some embodiments, the probability determining module 940 comprises: a map layer determining module configured to determine at least one map layer from the plurality of map layers based on a predetermined height of the estimated position and height information of the plurality of map layers, the predetermined height being within a height range associated with the at least one map layer; and a height determining module configured to determine the estimated height based on the predetermined height and height information of the at least one map layer.

In some embodiments, the probability determining module 940 comprises: a first reflection estimated probability determining module configured to determine, based on reflection information contained in the plurality of map layers and reflection information of the current point cloud data, a reflection estimated probability that the object is located at the estimated position with the estimated posture; a first height estimated probability determining module configured to determine, based on the height information contained in the plurality of map layers and height information contained in the current point cloud data, a height estimated probability that an object is located at the estimated position with the estimated posture; and a first estimated probability determining module configured to determine the estimated probability based on the reflection estimated probability and the height estimated probability.

In some embodiments, the first reflection estimated probability determining module comprises: a point cloud data determining module configured to determine a first dataset in the current point cloud data based on height information of one map layer selected from the plurality of map layers, height information of the first dataset corresponding to the height information of the selected one map layer; a layer reflection information similarity determining module configured to determine a layer reflection information similarity at least based on reflection information contained in the first dataset and reflection information contained in the map layer; and a second reflection estimated probability determining module configured to determine the reflection estimated probability at least based on the layer reflection information similarity.

In some embodiments, the first height estimated probability determining module comprises: a layer height information determining module configured to determine a layer height information similarity at least based on the height information contained in the first dataset and the height information contained in the map layer; and a second height estimated probability determining module configured to determine the height estimated probability at least based on the layer height information similarity.

In some embodiments, the probability determining module 940 comprises: a first map layer selecting module configured to select a set of map layers from the plurality of map layers based on height information of the current point cloud data, height information of the set of map layers matching the height information of the current point cloud data; and a second estimated probability determining module configured to determine the estimated probability based on the set of map layers and the current point cloud data.

In some embodiments, the probability determining module 940 comprises: a confidence parameter determining module configured to determine confidence parameters of a set of map layers, the confidence parameters including at least one of the following: the number of spatial parameters and ground parameters included in the set of map layers, noise data contained in the set of map layers, and the environment variables in the set of map layers; a second map layer selecting module configured to select at least one map layer from the set of map layers based on the confidence parameters; and a third estimated probability determining module configured to determine the estimated probability based on the at least one map layer and the current point cloud data.

In some embodiments, the positioning module 960 comprises: a third estimated probability determining module configured to obtain further estimated position of the object, further estimated height corresponding to the further estimated position, and further estimated probability that the object is located at the further estimated position with further estimated posture; and a second positioning information module configured to perform at least one of the following: determining the current position of the object based on the estimated position and the estimated probability and the further estimated position and the further estimated probability; determining the current height of the object based on the estimated height and the estimated probability and the further estimated height and the further estimated probability; and determining the current posture of the object based on the estimated posture and the estimated probability and the further estimated posture and the further estimated probability.

Figure 10:
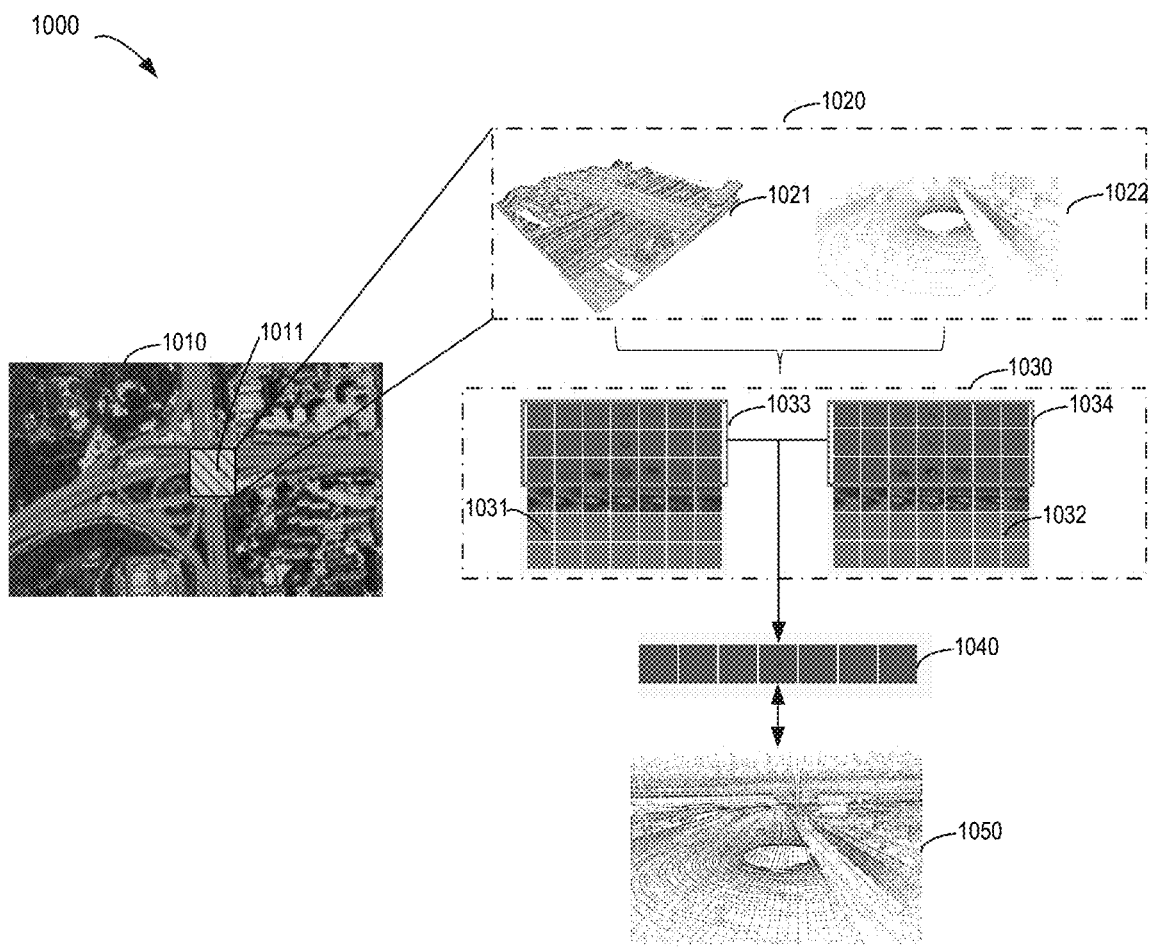
FIG. 10 shows a schematic diagram for visualizing a process 1000 for positioning an object according to some embodiments of the present disclosure.

FIG. 10 shows a schematic diagram for visualizing a process 1000 for positioning an object according to some embodiments of the present disclosure. For example, the process 1000 may be considered as an example implementation of the method 200 shown in FIG. 2, which may be performed by the apparatus 900. It should be understood that the process 1000 may also include additional actions not shown and/or the actions as shown may be omitted.

FIG. 10 shows a satellite view 1010 of a complex overpass scene. Block 1020 shows a visualization effect image of a multi-layer single Gaussian model map 1021 for a region 1011 where the object is located in the satellite view 1010, and a visualization effect image of the current point cloud data 1022. The multi-layer single Gaussian model map 1021 and the current point cloud data 1022 are used as input data, which are inputted into a histogram filter 1030, and then processed by the method described with reference to FIGS. 2 to 8 to obtain a matched result (estimated probability) between the map and the point cloud data.

In FIG. 10, the visualization effect 1031 reflects a reflection information matching histogram corresponding to map layers, and a set of map layers 1033 selected based on, for example, the method in FIG. 7. The visualization effect image 1032 reflects a height information matching histogram corresponding to map layers, and a set of map layers 1034 selected based on, for example, the method in FIG. 7.

The visualization effect image 1040 is a combination of (1) a reflection information matching histogram (which indicates a reflection estimated probability) for the set of map layers 1032, and (2) a height information matching histogram (which indicates a highly estimated probability) for the set of map layers 1034. Based on a combined histogram (which indicates the combination of the height estimated probability and the reflection estimated probability), the computing device 120 obtains a visualized positioning result 1050 for a current frame of the current point cloud data. The positioning result 1050 may reflect the positioning information of the object determined in the methods described in FIG. 2 to FIG. 8, and may be presented to an operator (for example, a driver) of the object in a visual form.

In one example, the computing device 120 may indicate the quality of the final positioning result by calculating a confidence level of the positioning information. A higher confidence level indicates a more accurate positioning. The confidence level of $C_{xyh}$ of the final positioning information $\hat{x}, \hat{y}, \hat{z}, \hat{h}$ obtained by Equation (1) may be expressed by the following Equation (16):

$$C_{xyh} = \frac{\sum_{xyh} P(x, y, h)^\beta \cdot (p - \hat{p})(p - \hat{p})^T}{\sum_{xyh} P(x, y, h)^\beta}. \tag{16}$$

where $\hat{p}=(\hat{x}, \hat{y}, \hat{h})$ represents the position and the heading angle in the final positioning information, and $p=(x, y, h)$ represents the estimated probability for each state in the region R in Equation (1). $\beta$ may be an empirical value, a predetermined value, or determined based on the current point cloud data (for example, it may be set to 1.1).

Through an actual testing in a multi-layer road scene, the solutions provided by the embodiments of the present disclosure may control an average of positioning drift in the multi-layer road scene to be below 10 cm, and a probability (confidence level) of drift below 30 cm is 100%.

Figure 11:
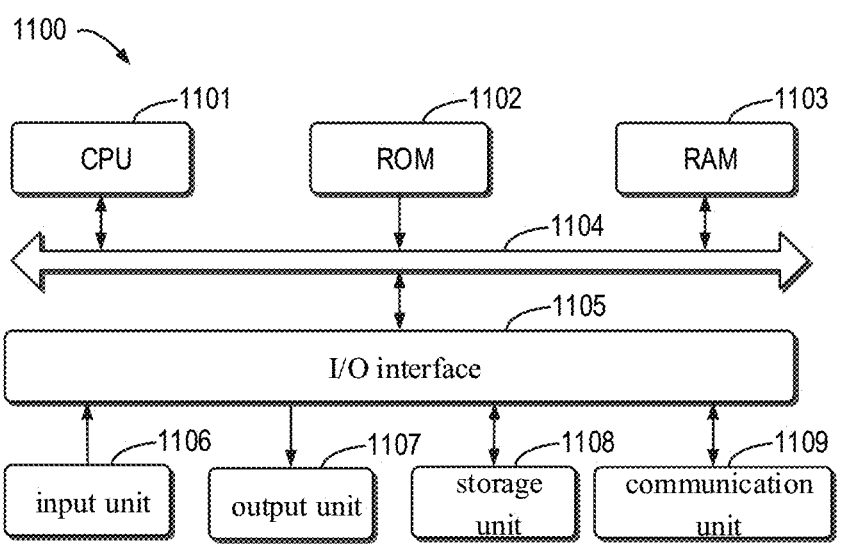
FIG. 11 shows a block diagram of a computing device 1100 capable of implementing various embodiments of the present disclosure.

FIG. 11 shows a schematic block diagram of an example device 1100 that may be used to implement embodiments of the present disclosure. The device 1100 may be used to implement the computing device 120 of FIG. 1. As shown, the device 1100 comprises a central processing unit (CPU) 1101 which is capable of performing various proper actions and processes in accordance with computer program instructions stored in a read only memory (ROM) 1102, or computer program instructions loaded from a storage unit 1108 to a random access memory (RAM) 1103. In the RAM 1103, various programs and data required by operations of the device 1100 may be stored. The CPU 1101, the ROM 1102 and the RAM 1103 are connected to one another via a bus 1104. An input/output (I/O) interface 1105 is also connected to the bus 1104.

Multiple components in the device 1100 are connected to the I/O interface 1105. The I/O interface 1105 includes: an input unit 1106 including a keyboard, a mouse, or the like; an output unit 1107, e.g., various displays and loudspeakers; the storage unit 1108 such as a magnetic disk, an optical disk or the like; and a communication unit 1109 such as a network card, a modem, a radio communication transceiver. The communication unit 1109 allows the apparatus 1100 to exchange information/data with other devices via a computer network such as Internet and/or various telecommunication networks.

The processing unit 1101 performs various methods and processes described above, such as the process 200. For example, in some embodiments, the process 200 may be implemented as a computer software program that is tangibly embodied on a machine-readable medium, such as the storage unit 1108. In some embodiments, part of the computer program or the entire computer program may be loaded and/or installed on the device 1100 via the ROM 1102 and/or the communication unit 1109. When a computer program is loaded into the RAM 1103 and executed by the CPU 1101, one or more steps of the process 200 described above may be performed. Alternatively, in other embodiments, the CPU 1101 may be configured to perform the process 200 by any other suitable means (e.g., by means of firmware).

The functions described above herein may be performed, at least in part, by one or more hardware logic components. For example, exemplary types of hardware logic components that may be used include but not limited to: Field Programmable Gate Array (FPGA), Application Specific Integrated Circuit (ASIC), Application Specific Standard Product (ASSP), System on Chip (SOC), Load programmable logic device (CPLD) and so on.

The computer program code for implementing the method of the subject matter described herein may be compiled with one or more programming languages. These computer program codes may be provided to a general-purpose computer, a dedicated computer or a processor of other programmable data processing apparatuses, such that when the program codes are executed by the computer or other programmable data processing apparatuses, the functions/operations prescribed in the flow chart and/or block diagram are caused to be implemented. The program code may be executed completely on a computer, partly on a computer, partly on a computer as an independent software packet and partly on a remote computer, or completely on a remote computer or server.

In the context of the subject matter described herein, the machine-readable medium may be any tangible medium including or storing a program used by or used in conjunction with an instruction executing system, apparatus or device. The machine-readable medium may be a machine-readable signal medium or machine-readable storage medium. The machine-readable medium may include, but not limited to, system, apparatus or device that are electronic, magnetic, optical, electro-magnetic, infrared, or of semiconductor, or any appropriate combination thereof. More detailed examples of the machine-readable storage medium include, an electrical connection having one or more wires, a portable computer magnetic disk, hard drive, random-access memory (RAM), read-only memory (ROM), erasable programmable read-only memory (EPROM or flash memory), optical storage apparatus, magnetic storage apparatus, or any non-transitory storage medium or any appropriate combination thereof.

Besides, although the operations are depicted in a particular order, it should not be understood that such operations are completed in a particular order as shown or in a successive sequence, or all shown operations are executed so as to achieve a desired result. In some cases, multi-task or parallel-processing would be advantageous. Likewise, although the above discussion includes some specific implementation details, they should not be explained as limiting the scope of any invention or claims, but should be explained as a description for a particular implementation of a particular invention. In the present description, some features described in the context of separate embodiments may also be integrated into a single implementation. On the contrary, various features described in the context of a single implementation may also be separately implemented in a plurality of embodiments or in any suitable sub-group.

Although the subject matter has been described in language specific to structural features and/or methodological actions, it should be understood that the subject matters specified in the appended claims are not limited to the specific features or actions described above. Rather, the specific features and actions described above are disclosed as example forms of implementing the claims.

We claim:

1. A method of positioning an object, comprising:
   obtaining a map related to a region where the object is located, the map comprising a plurality of map layers having different height information;
   determining, based on the map and current point cloud data related to the object, an estimated position of the object, an estimated height corresponding to the estimated position and an estimated probability that the object is located at the estimated position with an estimated posture; and
   determining, at least based on the estimated position, the estimated height and the estimated probability, positioning information for the object, the positioning information indicating at least one of a current position of the object, a current height of the object and a current posture of the object,
   wherein determining the estimated probability comprises:
   determining, based on reflection information comprised in the plurality of map layers and reflection information of the current point cloud data, a reflection estimated probability that the object is located at the estimated position with the estimated posture;
   determining, based on height information comprised in the plurality of map layers and height information comprised in the current point cloud data, a height estimated probability that the object is located at the estimated position with the estimated posture; and
   determining the estimated probability based on the reflection estimated probability and the height estimated probability.

2. The method according to claim 1, wherein obtaining the map comprises:
   obtaining historical point cloud data related to the region, the historical point cloud data collected during an historical time period;
   determining the plurality of map layers based on the historical point cloud data, each of the plurality of map layers comprising a plurality of map units, each map unit comprising spatial parameters for establishing a single Gaussian model and ground parameters; and
   generating the map based on the plurality of map layers.

3. The method according to claim 2, further comprising:
   selecting a set of map layers from the plurality of map layers based on height information of the current point cloud data, height information of the set of map layers matching the height information of the current point cloud data;
   determining, in the set of map layers, map units corresponding to the current point cloud data; and
   updating single Gaussian models of the map units corresponding to the current point cloud data, based on the current point cloud data.

4. The method according to claim 1, wherein determining the estimated height comprises:
   determining at least one map layer from the plurality of map layers based on a predetermined height of the estimated position and height information of the plurality of map layers, the predetermined height being within a height range associated with the at least one map layer; and
   determining the estimated height based on the predetermined height and height information of the at least one map layer.

5. The method according to claim 1, wherein determining the reflection estimated probability comprises:

determining a first dataset in the current point cloud data based on height information of one map layer selected from the plurality of map layers, height information of the first dataset corresponding to the height information of the selected one map layer;

determining a layer reflection information similarity at least based on reflection information comprised in the first dataset and reflection information comprised in the one map layer; and determining the reflection estimated probability at least based on the layer reflection information similarity.

6. The method according to claim 5, wherein determining the height estimated probability comprises:

determining a layer height information similarity at least based on height information comprised in the first dataset and height information comprised in the one map layer; and determining the height estimated probability at least based on the layer height information similarity.

7. The method according to claim 1, wherein determining the estimated probability comprises:

selecting a set of map layers from the plurality of map layers based on height information of the current point cloud data, height information of the set of map layers matching height information of the current point cloud data; and determining the estimated probability based on the set of map layers and the current point cloud data.

8. The method according to claim 7, wherein determining the estimated probability comprises:

determining confidence parameters of the set of map layers, the confidence parameters including at least one of the number of spatial parameters and ground parameters comprised in the set of map layers, noise data comprised in the set of map layers, and environment variables in the set of map layers;

selecting at least one map layer from the set of map layers based on the confidence parameters; and determining the estimated probability based on the at least one map layer and the current point cloud data.

9. The method according to claim 1, wherein determining the positioning information comprises:

obtaining a further estimated position of the object, a further estimated height corresponding to the further estimated position, and a further estimated probability that the object is located at the further estimated position with a further estimated posture; and determining the positioning information by performing at least one of:

determining the current position of the object based on the estimated position, the estimated probability, the further estimated position and the further estimated probability;

determining the current height of the object based on the estimated height, the estimated probability, the further estimated height and the further estimated probability; and determining the current posture of the object based on the estimated posture, the estimated probability, the further estimated posture and the further estimated probability.

10. An electronic device, comprising:

one or more processors; and a storage apparatus for storing one or more programs which, when executed by the one or more processors, cause the one or more processors to perform a method of positioning an object, the method comprising:

obtaining a map related to a region where the object is located, the map comprising a plurality of map layers having different height information;

determining, based on the map and current point cloud data related to the object, an estimated position of the object, an estimated height corresponding to the estimated position and an estimated probability that the object is located at the estimated position with an estimated posture; and determining, at least based on the estimated position, the estimated height and the estimated probability, positioning information for the object, the positioning information indicating at least one of a current position of the object, a current height of the object and a current posture of the object, wherein determining the estimated probability comprises:

determining, based on reflection information comprised in the plurality of map layers and reflection information of the current point cloud data, a reflection estimated probability that the object is located at the estimated position with the estimated posture;

determining, based on height information comprised in the plurality of map layers and height information comprised in the current point cloud data, a height estimated probability that the object is located at the estimated position with the estimated posture; and determining the estimated probability based on the reflection estimated probability and the height estimated probability.

11. The electronic device according to claim 10, wherein obtaining the map comprises:

obtaining historical point cloud data related to the region, the historical point cloud data collected during an historical time period;

determining the plurality of map layers based on the historical point cloud data, each of the plurality of map layers comprising a plurality of map units, each map unit comprising spatial parameters for establishing a single Gaussian model and ground parameters; and generating the map based on the plurality of map layers.

12. The electronic device according to claim 11, wherein the method further comprises:

selecting a set of map layers from the plurality of map layers based on height information of the current point cloud data, height information of the set of map layers matching the height information of the current point cloud data;

determining, in the set of map layers, map units corresponding to the current point cloud data; and updating single Gaussian models of the map units corresponding to the current point cloud data, based on the current point cloud data.

13. The electronic device according to claim 10, wherein determining the estimated height comprises:

determining at least one map layer from the plurality of map layers based on a predetermined height of the estimated position and height information of the plurality of map layers, the predetermined height being within a height range associated with the at least one map layer; and determining the estimated height based on the predetermined height and height information of the at least one map layer.

14. The electronic device according to claim 10, wherein determining the reflection estimated probability comprises:

determining a first dataset in the current point cloud data based on height information of one map layer selected from the plurality of map layers, height information of the first dataset corresponding to the height information of the selected one map layer;

determining a layer reflection information similarity at least based on reflection information comprised in the first dataset and reflection information comprised in the one map layer; and determining the reflection estimated probability at least based on the layer reflection information similarity.

15. The electronic device according to claim 14, wherein determining the height estimated probability comprises:

determining a layer height information similarity at least based on height information comprised in the first dataset and height information comprised in the one map layer; and determining the height estimated probability at least based on the layer height information similarity.

16. The electronic device according to claim 10, wherein determining the estimated probability comprises:

selecting a set of map layers from the plurality of map layers based on height information of the current point cloud data, height information of the set of map layers matching height information of the current point cloud data; and determining the estimated probability based on the set of map layers and the current point cloud data.

17. The electronic device according to claim 10, wherein determining the positioning information comprises:

obtaining a further estimated position of the object, a further estimated height corresponding to the further estimated position, and a further estimated probability that the object is located at the further estimated position with a further estimated posture; and determining the positioning information by performing at least one of:

determining the current position of the object based on the estimated position, the estimated probability, the further estimated position and the further estimated probability;

determining the current height of the object based on the estimated height, the estimated probability, the further estimated height and the further estimated probability; and determining the current posture of the object based on the estimated posture, the estimated probability, the further estimated posture and the further estimated probability.

18. A non-transitory computer-readable storage medium having a computer program stored thereon that, when executed by a processor, performs a method of positioning an object, the method comprising:

obtaining a map related to a region where the object is located, the map comprising a plurality of map layers having different height information;

determining, based on the map and current point cloud data related to the object, an estimated position of the object, an estimated height corresponding to the estimated position and an estimated probability that the object is located at the estimated position with an estimated posture; and determining, at least based on the estimated position, the estimated height and the estimated probability, positioning information for the object, the positioning information indicating at least one of a current position of the object, a current height of the object and a current posture of the object, wherein determining the estimated probability comprises:

determining, based on reflection information comprised in the plurality of map layers and reflection information of the current point cloud data, a reflection estimated probability that the object is located at the estimated position with the estimated posture;

determining, based on height information comprised in the plurality of map layers and height information comprised in the current point cloud data, a height estimated probability that the object is located at the estimated position with the estimated posture; and determining the estimated probability based on the reflection estimated probability and the height estimated probability.

* * * * *